United States Patent [19]

Deng et al.

[11] Patent Number: 4,924,956

[45] Date of Patent: May 15, 1990

[54] FREE-PISTON ENGINE WITHOUT COMPRESSOR

[75] Inventors: Yuan Q. Deng; Kang Deng, both of New York, N.Y.

[73] Assignee: RDG Inventions Corporation, New York, N.Y.

[21] Appl. No.: 154,145

[22] Filed: Feb. 9, 1988

Related U.S. Application Data

[63] Continuation-in-part of Ser. No. 923,085, Oct. 24, 1986, abandoned.

[51] Int. Cl.[5] .................................... B60K 1/04

[52] U.S. Cl. .................................... 180/65.3; 123/46 R; 123/46 E; 310/30

[58] Field of Search .................... 180/65.5, 65.4, 65.3; 123/46 R, 46 B, 46 E, 45 R, 45 A, 65 E; 290/1 R, 45; 310/15, 30

[56] References Cited

U.S. PATENT DOCUMENTS

| | | | |
|---|---|---|---|
| 2,064,976 | 12/1936 | Janicke | 123/46 |
| 2,102,559 | 12/1937 | Kadenacy | 60/314 X |
| 2,110,986 | 3/1938 | Kadenacy | 60/324 |
| 2,113,480 | 4/1938 | Kadenacy | 123/65 E X |
| 2,123,569 | 7/1938 | Kadenacy | 123/65 E X |
| 2,130,721 | 9/1938 | Kadenacy | 123/65 E X |
| 2,131,957 | 10/1938 | Kadenacy | 123/65 E X |
| 2,131,959 | 10/1938 | Kadenacy | 123/65 E X |
| 2,134,920 | 11/1938 | Kadenacy | 123/65 E X |
| 2,144,065 | 1/1939 | Kadenacy | 123/65 E |
| 2,147,200 | 2/1939 | Kadenacy | 60/314 |
| 2,167,303 | 7/1939 | Kadenacy | 60/324 |
| 2,168,528 | 8/1939 | Kadenacy | 123/51 BA X |
| 2,876,751 | 3/1959 | Kolthoff, Jr. | 123/46 B |
| 3,112,060 | 11/1963 | Ollier et al. | 123/46 |
| 3,234,395 | 2/1966 | Colgate | 123/46 E |
| 3,347,215 | 10/1967 | Pescara | 123/46 R |
| 3,370,576 | 2/1968 | Huber | 123/46 R |
| 3,501,087 | 3/1970 | Benaroya | 123/46 |
| 3,541,362 | 11/1970 | Pouit | 290/1 R |
| 3,661,476 | 5/1972 | Benaroya | 123/46 B X |
| 3,835,824 | 9/1974 | MacDonald | 123/46 R |
| 4,091,775 | 5/1978 | Curtil | 123/65 E |
| 4,187,436 | 2/1980 | Etienne | 180/65.4 X |
| 4,480,599 | 11/1984 | Allais | 123/46 E X |
| 4,532,431 | 7/1985 | Iliev et al. | 123/46 E X |
| 4,593,779 | 6/1986 | Krohling | 180/65.4 |

FOREIGN PATENT DOCUMENTS

| | | | |
|---|---|---|---|
| 62-38832 | 2/1987 | Japan | 123/46 R |

OTHER PUBLICATIONS

Schweitzer, VanOverbike and Manson, "Taking the Mystery Out of the Kadenacy System of Scavenging Diesel Engines," Transactions of the ASME (10/1946), pp. 729–734.

McKosh, Dan, "Gasoline/Electric Sports Car," *Popular Science* (8/1986), pp. 76–79.

Collie, M. J., "Electric and Hybrid Vehicles", Park Ridge, N.J., Noyes Data Corp. (1979), pp. 16–31 and 192–203.

Dr. Lizt, The Collected Works of Internal Combustion Engines, 1940, section 4, part 3, vol. 4, Kadenacy Effect by Dr. G. Reyl (pp. 165–173).

*Primary Examiner*—Charles A. Marmor
*Assistant Examiner*—Tamara L. Finlay
*Attorney, Agent, or Firm*—Rosen, Dainow & Jacobs

[57] ABSTRACT

A double-acting tandem free-piston engine comprising a housing including a cylinder having combustion chambers at opposite ends and one in its center with double-acting pistons displaceable between one end and the center chamber and between the other end and the center chamber. Each piston includes opposite piston heads with connecting rods between them together with balancing means to provide symmetrical piston movement. Each combustion chamber has a inlet port and valve and an exhaust valve, the valves timed to open and close to produce a pressure volume relationship therein wherein the pressure drops below atmospheric during at least a portion of the piston's displacement. The engine combined with a linear alternator in a hybrid vehicle powers electric wheel driving motors and stores power in its storage battery.

13 Claims, 5 Drawing Sheets

FREE-PISTON ENGINE WITHOUT COMPRESSOR

This application is a continuation-in-part of application Ser. No. 923,085, filed Oct. 24, 1986, abandoned; however the filing of this application as a continuation-in-part does not constitute an admission that this application contains matter that is new matter with respect to patent application Ser. No. 923,085.

BACKGROUND OF THE INVENTION

This invention is in the field of internal combustion, free-piston, reciprocating engines, and particularly such engines cooperating or combined with linear generators, air compressors or hydraulic pumps for use in a hybrid automobile vehicle, boat, locomotive, or power plant.

Free-piston engines of various types are known and have certain essential features common to them all. The variations of free-piston engines include, for example, a pair of opposed pistons in a single cylinder as seen in U.S. Pat. No. 3,234,395; a central piston rod having end-pistons at opposite ends with a cooperating free-piston axially spaced from each end-piston, thus forming two pairs of free-pistons as seen in U.S. Pat. Nos. 3,541,362; 3,501,087 and 3,347,215; opposed sets of pistons with each set attached to a common rod, the inner pistons of the sets cooperating in a single cylinder and the remote outer pistons of the sets in separate cylinders, as seen in U.S. Pat. No. 4,480,599; and one pair of pistons on a single rod with separate cylinders for each piston as seen in U.S. Pat. No. 4,532,431. The general principles of operation of these and related free-piston engines are well known, with combustion at appropriate times, often by Diesel cycle, providing the power strokes of the pistons combined with appropriate inlet and outlet valves and/or ports.

One particularly significant feature common to all these engines is a compressor component or an inlet for communicating compressed air from an external compressed air source to the combustion chambers. In U.S. Pat. No. 4,532,431, for example, power piston 1 has a backside remote from the ignition plug for compressing air to flow through duct 7 to the combustion chamber. In U.S Pat. No. 3,501,087 piston 19 functions as a compressor; U.S. Pat. No. 3,347,215 discloses a compressor piston and compressed air ducts 19*a*, 19*b*, 20*a* and 20*b;* in U.S. Pat. No. 234,395 the backside of each piston 18, 19 compresses the air; U.S. Pat. No. 3,370,576 discloses compressed air from an external source for entry via duct 7; U.S. Pat. No. 4,480,599 discloses use of an independent motor 9 or a compressed air system; and U.S. Pat. No. 3,541,362 discloses compressed air from a supercharger or other source, which is a common method for starting free-piston engines of the types discussed above.

As is known, free-piston engines have certain advantages over rotary engines; however, for other reasons, rotary engines have been the subject of vastly greater industrial and commercial success, the most obvious examples being the rotary engines used in automobiles and other land, water and air vehicles. The principal advantage of the free-piston engine is the elimination of the crank shaft; however, the disadvantage as seen in essentially all the prior art free-piston engines is the required air compressor component or connection to a source of compressed air.

A conventional prior art free-piston engine is shown schematically in FIG. 2 of the drawings herein where the inner sides of the two pistons 4 operate within the cylinder as compressors, thus necessitating additional space and weight. A feature of free-piston engines which have opposed pistons is apparatus to balance and coordinate these pistons. One arrangement is to provide a pinion whose axis of rotation is perpendicular to the longitudinal axis of the free-pistons and cylinder. The pinion is engaged on one side by a rack extending from the left piston and is engaged on the other side by a rack extending from the right piston. Thus, as the pistons move toward each other in the cylinder, the pinion rotates in one direction, and when the pistons move away from each other the pinion rotates in the reverse direction; however, at all times the axial displacement of one piston is controlled to have exactly the same magnitude and opposite direction of the other piston.

Because rotary engines with crankshafts are so common the nomenclature describing their operation has become essentially standard, even in part for use with free-piston engines having no rotary crankshafts. For example, a free-piston is described as being at top dead position (TDP), or at lower dead position (LDP), or at 30 degrees of crank rotation before LDP, even in the absence of any rotary crank. More specifically in a free-piston engine, the two opposite extreme linear displacements are called LDP and TDP for lower dead position and top dead position respectively, and the intermediate piston linear displacements are treated as if they are fractions of the 180° rotary crank displacement between these dead positions.

In the history of rotary engine development one concept that was discovered about fifty years ago but not utilized commercially was an air pressure phenomenon called the "Kadenacy effect", named after its discoverer. Kadenacy modified a two-cycle, rotary, Junker Diesel engine by eliminating a compressor or blower attachment for the inlet air and altered the timing of the inlet and outlet ports which led to substantially increased rotary speed and horsepower. Two curious aspects of this alteration were lower inlet air temperature, by eliminating heating resulting from compression, that led to increased volumetric efficiency and an actual negative pressure in the bottom part of the air admission and exhaust region that aided in admitting fresh air into the cylinder without aid of an air compressor.

To commercialize free-piston engines has been an unfulfilled dream of engine makers for many years, the main problem being the costly and bulky air compressors required since there was no crankshaft to drive the piston in a compression stroke. The above-mentioned "Kadenacy effect" was not applied to free-piston engines, firstly, because it was originated for rotary engines with no contemplation for use in free-piston engines, secondly, no one even considered eliminating the compressors always deemed necessary in free-piston engines, and thirdly, because the "Kadenacy effect" was not even accepted and used commercially in the world standard rotary engines and therefore not imaginable for free-piston engines.

Extensive disclosure of the Kadenacy concepts may be found in the U.S. patents of Kadenacy, Nos.

| | | | |
|---|---|---|---|
| 2,102,559 | 2,123,569 | 2,131,959 | 2,147,200 |
| 2,110,986 | 2,131,957 | 2,134,920 | 2,167,303 |

-continued

| | | | |
|---|---|---|---|
| 2,113,480 | 2,130,721 | 2,144,065 | 2,168,528 |

Kadenacy's claims were acknowledged by some experts in the field and ignored and even ridiculed by others, as is discussed in the article "Taking the Mystery Out of the Kadenacy System of Scavenging Diesel Engines" by P. H. Schweitzer, C. W. Van Overbike, and L. Manson in the October, 1946 "Transactions of the A.S.M.E.", a copy of which is appended hereto as Appendix III.

In summary, the Kadenacy theories have been either acknowledged by some or challenged by others, but generally not accepted or followed, and certainly not considered by person's skilled in the art as an acceptable or workable system for use or combination into a commercially feasible engine.

The free-piston engine of the present invention has particular application in combination with a linear generator for powering a hybrid automobile or for other purposes. The subject of hybrid vehicles has lured professional and amateur scientists to spend vast amounts of time and money, thus far without commercial success even though there has been much progress with the storage battery elements and motors used in the all electric vehicles. Reports of these developments may be found, for example in the book *Electric and Hybrid Vehicles* by M. J. Collie, 1979, Noyes Data Corp., Park Ridge, N.J., portions of which are annexed hereto as Appendix I and in the article "Gasoline/Electric Sports Car" by Dan McCosh, pp. 76–79 in *Popular Science*, August, 1986, a copy of which is attached hereto as Appendix II, the full texts of these appendices being incorporated by reference herein. In *Electric and Hybrid Vehicles* on pages 25–31 and pages 193–203 there is discussion of electric and hybrid vehicle systems, operating modes and components, with a particular survey of prior art combustion engine power sources, namely "reciprocating" spark-ignition engines, diesel engines, rotary engines, Stirling engines and gas turbine engines. It is noteworthy in this reference that the free-piston engine is not even mentioned or considered as the heat or combustion engine component for hybrid vehicles. In the Popular Science article of Appendix II the author, illustrating a typical reciprocating V or in-line combustion engine, states, > Since the beginning of the automobile age, power has been transferred from engine to wheels through drive shafts and transmissions. The goal with the new system is to break with that tradition entirely and convert the raw energy of an internal combustion engine—still the lightest, most efficient source of on-board power for a car—into electricity that powers a motor at each wheel.

Additionally, the separation of the engine shaft from the wheels of a vehicle permits the engine to run at its maximum efficiency and results in a 100% increase in efficiency. When the battery of a hybrid vehicle is completely charged, the engine stops by itself; when the battery's charge is low, the engine runs, thereby charging the battery with its highest efficiency. Thus, such a hybrid vehicle is twice as efficient as conventional ones, and such a hybrid passenger automobile is able to get 100 miles to the gallon.

Obviously, with this intense concern to improve power versus weight and efficiency relative to power and weight, an improvement of these parameters in the engine would be equally or more significant than the improvements in the electrical components, i.e. the generators, generator-motors, fly wheel-generator-motors, batteries, and electronic logic and control systems many of which have already been improved considerably to their current status. The present invention provides such an improved combustion engine power source in a new free-piston engine.

SUMMARY OF THE INVENTION

The present invention involves a major change in typical and conventional free-piston engines, with the total elimination of an air compressor and a radical alteration in the timing of valves and/or ports for air inlet and gas exhaust. The result not only permits operation of a free piston engine with no compressor, but permits operation with improved volumetric efficiency and power development. The new engine in combination with electrical components in hybrid engine vehicles will render such vehicles more efficient than known hybrid systems and may render it possible, finally, for successful commercialization of these systems.

DETAILED DESCRIPTION OF THE PREFERRED EMBODIMENT

Figures 1, 1A, 1B:
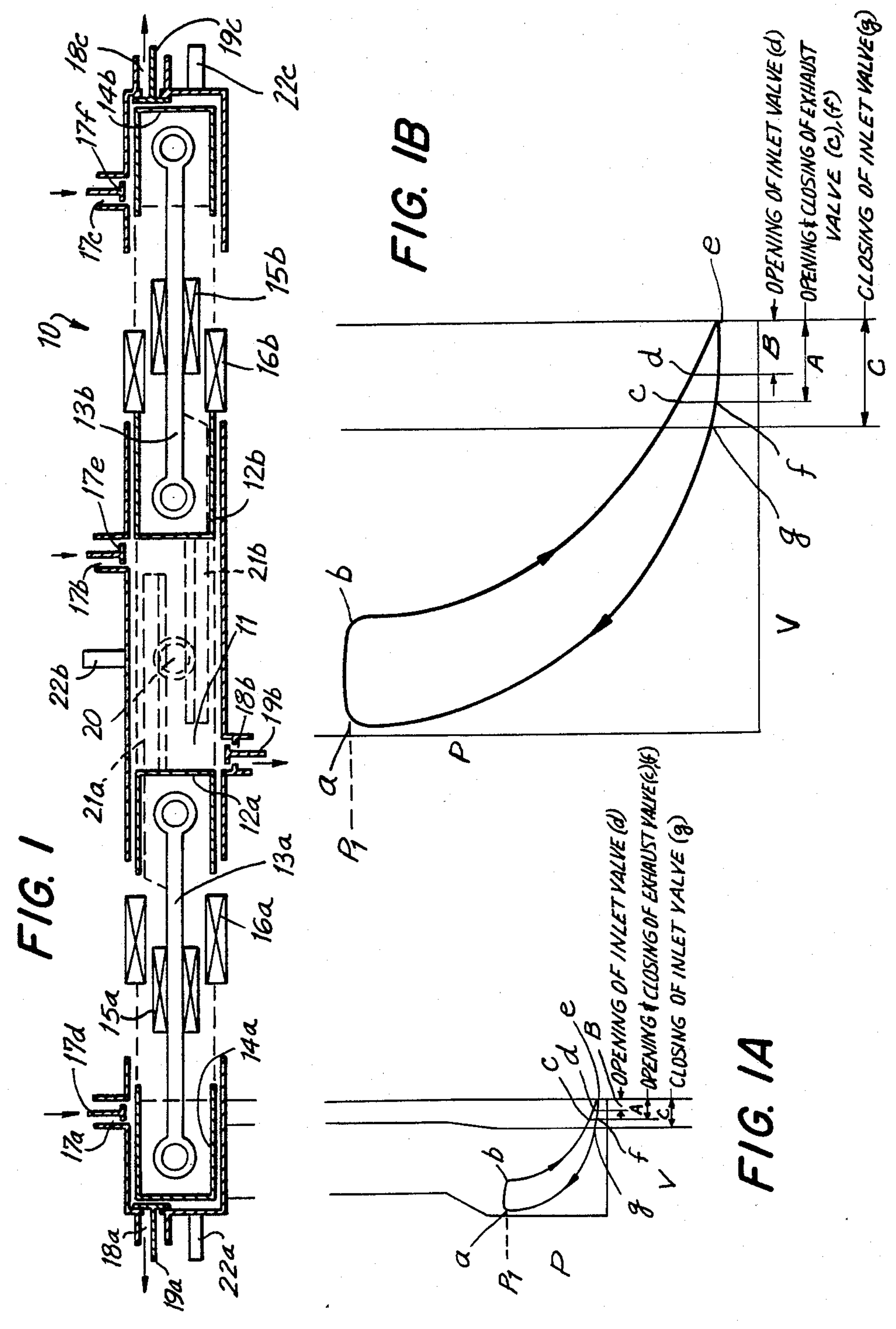
FIG. 1 is a schematic side elevation of a double-acting tandem free-piston engine-alternator set of the present invention.
FIG. 1A is a P-V, pressure volume displacement chart for the operation of the engine of FIG. 1.
FIG. 1B is an enlarged P-V, pressure volume displacement chart of FIG. 1A.

The preferred embodiment of the new engine illustrated schematically in FIG. 1, is a two-cycle Diesel engine constructed as a double-acting tandem free-piston engine and alternator set represented generally by reference numeral 10. The engine has a cylinder housing or barrel 11, inner pistons **12*a* and 12*b*, connecting or piston rods 13*a* and 13*b*, and outer pistons 14*a* and 14*b*. Fixed on the piston rods are linear alternator runners 15*a* and 15*b* which are operative respectively with linear alternator stators 16*a* and 16*b* fixed to the cylinder housing 11**.

The engine has air inlet ports **17*a*, 17*b* and 17*c* with air inlet valves 17*d*, 17*e* & 17*f* respectively and gas exhaust ports 18***a*, 18*b* and 18*c* with exhaust port valves 19*a*, 19*b* and 19*c* respectively all said valves operated by timing means not shown. A balancing means comprising central pinion 20 is engaged by racks 21*a* and 21*b* fixed to pistons 12*a*, 12*b* respectively or to piston rods 13*a* or 13*b*. Oil inlet nozzles 22*a*, 22*b* and 22*c* are provided for lubrication. Circuit and electrical switch means not shown are provided for tapping electrical current from the alternator during power operation of the engine or for energizing the alternator when it is used to start the engine.

This operation of this engine involves the reciprocal motion of the left and right piston assemblies in cooperation with very specific timing of valves and ports. As seen in FIG. 1, typical inlet port 17 includes a valve 17*e* which can be made to open and close independent of the position of piston 12*b* which will sometimes overlie and seal this port merely by movement to the left of piston 12*b* whose outer surface overlies and seals the opening of port 17*b*. Outlet port 18*b* also includes a valve 19*b* which can be made to open and close independent of the position of piston 12*a* which will sometimes overlie and seal this port.

In the apparatus of the present invention the valve and port timing is established to produce a pressure-volume diagram generally represented in FIGS. 3 and IA and further explained as follows. Outer piston 14*a* operable with inlet 17*a* and exhaust 19*a* will be considered as typical and representative of all four piston, cylinder and port/valve sub-assemblies.

First consider the P-V chart of FIG. 1A. Pressure is obviously maximum at the top dead point (TDP) or point a of piston 14*a*. With combustion and beginning piston displacement from point a to point b the pressure remains essentially at maximum, $p_1$. From point b to e as the piston moves toward its lower dead point (LDP) the pressure declines; at point c the exhaust valve opens; at point d the inlet valve opens; point e is LDP; at point f the exhaust valve closes; at point g the inlet valve closes and pressure begins to rise more rapidly; and point a is TDP again.

Figure 3:
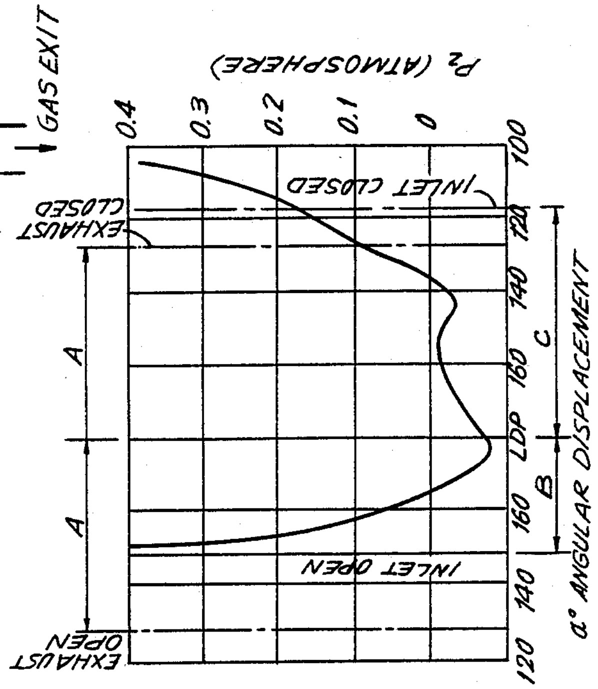
FIG. 3 is a P-V, pressure vs. angular displacement chart of an engine as disclosed in FIG. 1.

FIG. 3 discloses a pressure piston-displacement diagram in greater detail as corresponds to the P-V diagram of FIG. 1A; the data from this diagram is summarized in Chart 1 below which shows appropriate data that may vary with different embodiments; the first column indicates piston positions appearing in FIG. 1A.

CHART 1

| Piston Position | Approx. degrees of equivalent rotary displacement | Pressure | |
|---|---|---|---|
| a | 0° TDP | High | TDP |
| b | 45° | High | |
| c | 130° | +150 atm. | Exhaust opens |
| d | 150° | +0.4 atm. | Inlet opens |
| | 165° | 0.0 atm. | |
| | 175° | −0.09 atm. | |
| e | 180° LDP | −0.07 atm. | |
| | 160° | −0.01 atm. | |
| | 145° | −0.03 atm. | |
| | 140° | −0.02 | |
| | 138° | 0.0 atm. | |
| f | 130° | +0.1 atm. | Exhaust closed |
| | 120° | +0.16 atm. | |
| g | 118° | +0.18 atm. | Inlet closed |
| | 116° | +0.2 atm. | |

Of great significance in this chart is the long period of negative pressure in the region before and after the LDP of the piston. This occurs because of the Kadenacy effect, and the result is a unusually high inflow of inlet air without requirement of an external compressor and thus without increasing the temperature of said inlet air.

From FIGS. 1A and 3 and Chart 1 it is apparent that the exhaust valve opening and closing is symmetrical as regards timing relative to LDP. This exhaust valve opening is indicated as points c and f in FIG. 1A and reference letters A situated above the FIG. 3 diagram, occurring about 50°±15° to ±20° before and after LDP. The timing of the inlet valve is non-symmetrical, being about 30°±10° to ±20° before LDP and about 62°±10° to ±20° after LDP, corresponding to references B and C respectively on FIG. 1A and 3 and Chart 1. As seen in FIG. 1 there are three exhaust valves 19*a*, 19*b* and 19*c* and three inlet valves 17*d*, 17*e* and 17*f* whose opening and closing operations are timed to provide the pressure-displacement parameters set forth above.

The present invention is highly successful for its improved power and efficiency largely because of the negative pressure during piston displacement for about 15° before LDP at 165°±15° and 45° after LDP at 135°±15°. This phenomenon at the bottom of the combustion or power stroke occurs as the expanding combustion gas reflects with the speed of sound between the cylinder wall and the moving piston forming a vibration therebetween, leading to the pressure variations shown in FIG. 3, i.e. a self-induced partial vacuum using residual energy of the exhaust gas that draws in inlet air without being compressed. This phenomenon effectuates a wave action which will render the engine considerably more efficient than conventional rotary, reciprocating and free piston engines.

Figure 5B:
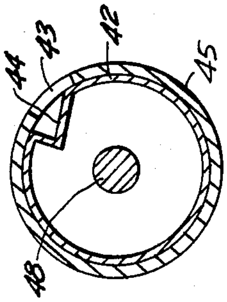
FIG. 5B is similar to FIG. A, with the piston and indentation aligned with the port opening.
Figure 5A:
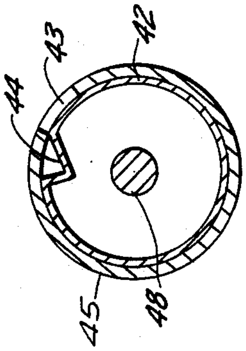
FIG. 5A is a fragmentary view in section of the piston and cylinder of FIG. 5 with the piston in rotated orientation.
Figure 5:
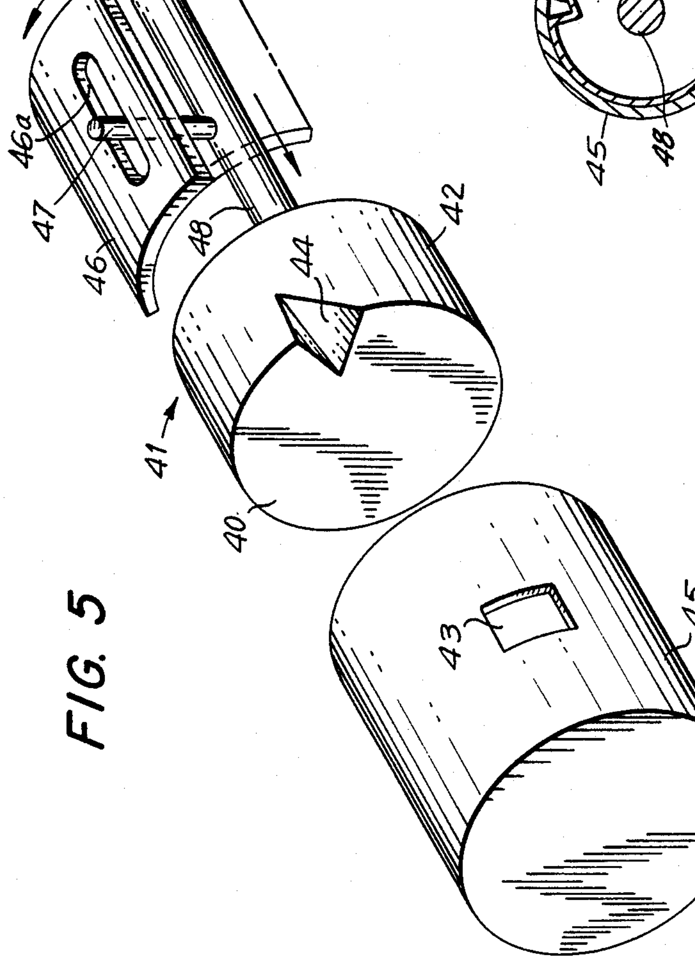
FIG. 5 is a schematic representation in perspective view of a piston, cylinder and inlet port or valve of FIG. 1.
Figure 5C:
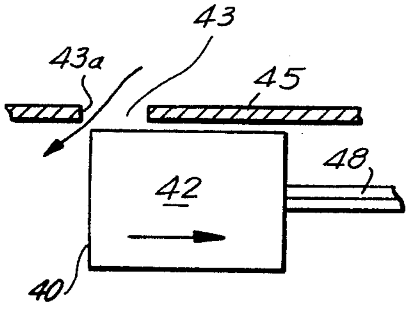
FIG. 5C shows a fragmentary view in section of a standard piston and port opening.
Figure 5D:
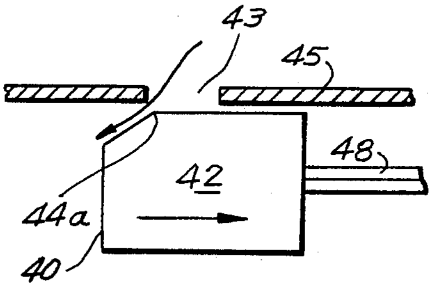
FIG. 5D is similar to FIG. 5C, but shows a piston of FIG. 5 with an indented piston head.

FIG. 5 shows one particular embodiment 41 of a piston 42 and inlet port 43 set as used in the engine of FIG. 1, where the timing is easily variable by merely rotating the piston about its longitudinal axis within cylinder housing 45. When the cut-away or bevelled area 44 on the top or top surface 40 of piston 42 is rotated to be remote from the port opening 43 as shown in FIG. 5A, the port can not become open until the flat end bore 40 of the piston reaches the beginning edge 43*a* of the port, see FIG. 5C. With the bevelled piston, the port can open much sooner, i.e. with less piston displacement, as shown both in FIG. 5 and FIG. 5B, namely when the lead part of the bevel 44*a* encounters the beginning of the port opening 43*a* as seen in FIG. 5D. To vary this timing, assuming its inlet valve (not shown) is open, it is merely required that the piston be rotated to bring the bevel partially into alignment with the port opening. The greater the rotation, the more of the bevel that is active and the greater the advancement or retardation of the timing.

FIG. 5 shows schematically how the piston rotation discussed above can be easily effectuated by a camming mechanism. In FIG. 5 a cam plate 46 is fixed to the cylinder housing, and a follower pin 47 is secured to the connecting rod 48 that extends between the pistons. Simple adjustment of the cam plate location along arrow 49 will vary the piston rotation as desired. If cam slot 46*a* is inclined relative to the piston's longitudinal axis, the piston will rotate slightly clockwise with each stroke in one direction and will rotate back counterclockwise with each return stroke, thus establishing, in part, a timing cycle.

Figure 6:
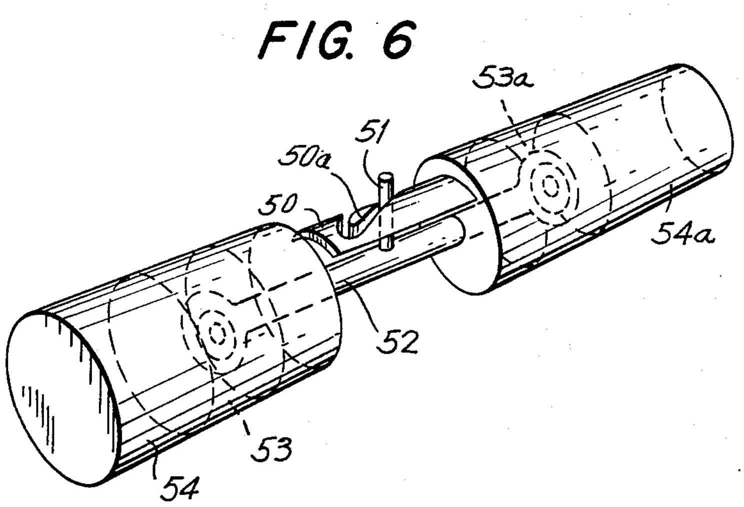
FIG. 6 is similar to FIG. 5 showing a different rotating mechanism for the piston of FIG. 5.

FIG. 6 shows schematically another embodiment of the piston rotation means with a cam plate 50 fixed to the cylinder housing with a follower pin 51 fixed to the connecting rod 52 between pistons 53 and 53*a* within cylinders 54 and 54*a* respectively. Cooperating with the cam plate 50 is a guide bar 50*a* to define a path for follower pin 51 to have a return stroke different from the power stroke. The shape and position of the cam 50, 50*a* determine, in part, the timing of the port openings which may be further effected by a beveled area 44 of the type shown in FIGS. 5–5D.

Figure 2:
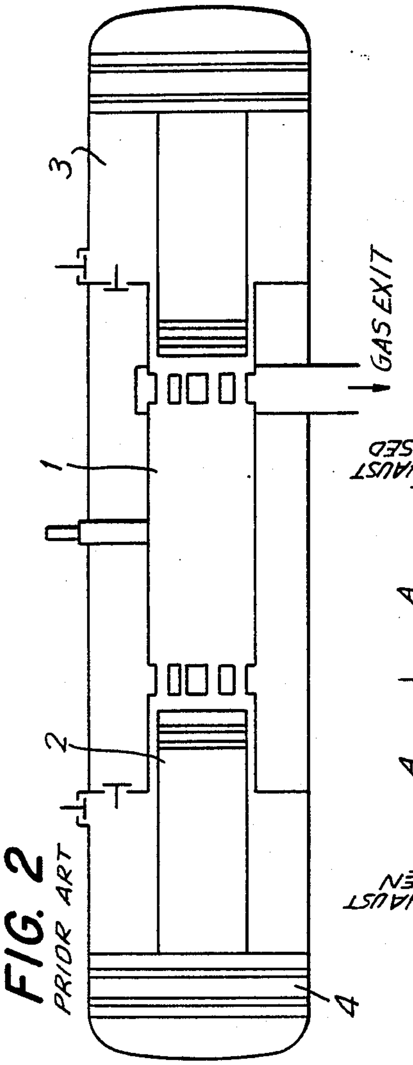
FIG. 2 PRIOR ART
FIG. 2 is a schematic side elevation of a conventional prior art free-piston engine with a pair of opposed pistons.
Figure 4:
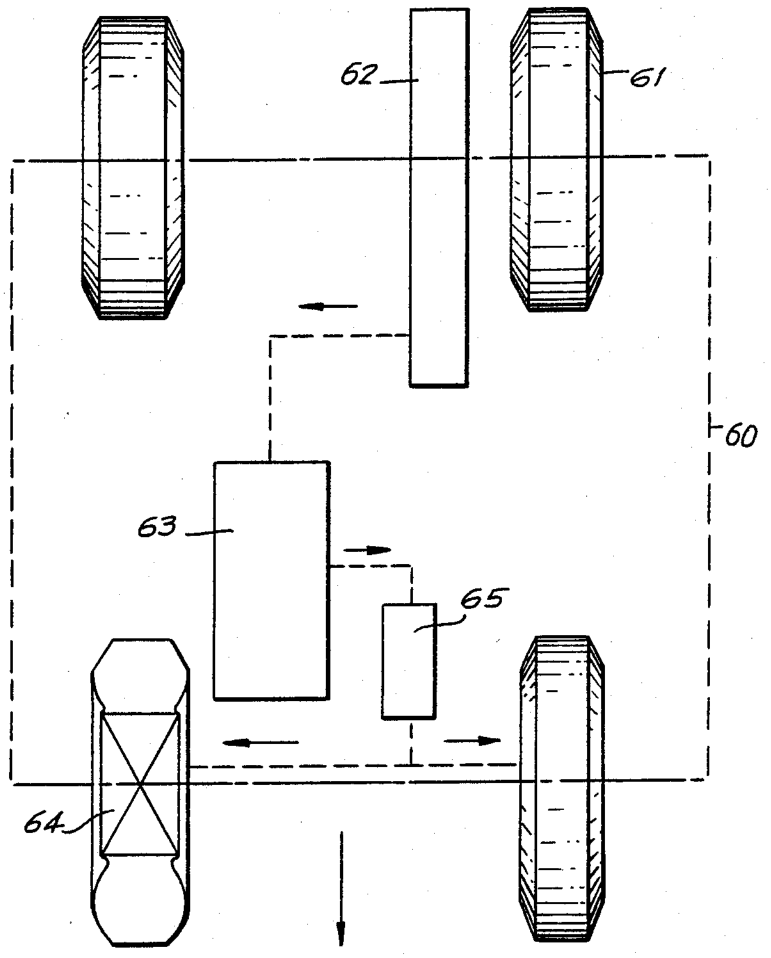
FIG. 4 is a top plan view schematic of a hybrid battery car with a free-piston engine.

FIG. 4 shows schematically a simple hybrid system or vehicle comprising a frame 60, wheels 61, a free-piston engine 62, a battery set 63, a typical electric motor 64 coupled to a wheel, and an electrical control system represented by 65 but otherwise not shown. The preferred embodiment of the present invention, as schematically illustrated in FIG. 1 is operationally represented in FIG. 3. In the arrangement shown combustion explosions occur at both ends of the cylinder shown without need of air baffles to bounce the piston back to firing position, as required in some prior art engines exemplified in FIG. 2. This new engine is well-adaptable for land and water vehicles, as cars, trucks, locomotives and boats and for on site power plants. Hybrid cars are a particularly good candidate for this invention, using electric storage batteries charged by the linear alternators and direct current motors coupled to the wheels. The potential advantages of hybrid automotive systems is well known, as discussed in the appendices attached hereto, and obviously includes the ability to operate the combustion engine at maximum efficiency independent of the wheels, load and/or velocity of the vehicle. Furthermore, the direct-current motors coupled to the wheels function as generators when the car is braked, which contributes to the enhanced efficiency. Other operational details of the free-piston engine, such as fuel selection, lubrication, tolerances, construction details, etc. can be easily determined from known prior art free-piston engines that use conventional compressors to permit practical operation. While the specification herein and appended claims describes only a single preferred embodiment of the new invention, it will be obvious to those skilled in the art that various changes and modifications may be made therein without departing from the invention, and it is therefore to be understood that the invention is not restricted to the details of the present disclosure otherwise than as defined in the appended claims.

We claim:

1. A double-acting tandem free-piston engine comprising:

a housing including a cylinder having first and second combustion chambers at opposite ends thereof and a third combustion chamber between said ends, a first double-acting piston displaceable between said first and third combustion chambers, and a second similar piston displaceable between said second and third combustion chambers, each double acting piston including opposite piston heads and a connecting rod between said heads, balancing means coupling said two pistons to move symmetrically, each of said combustion chambers including an inlet valve and an exhaust valve, said valves being timed to open and close to produce a pressure-volume relationship in each of said combustion chambers wherein said pressure drops below atmospheric during at least a portion of the piston displacement.

2. Apparatus according to claim 1 further comprising, a linear alternator operable with each piston, each linear alternator comprising stator and runner parts, one of these parts secured to said rod and the other of said parts secured to the housing adjacent said rod.

3. Apparatus according to claim 2 wherein said pressure drops below atmospheric during the piston displacement therein of about 15°±1520 before the lower dead point (LDP) and about 45°±15° after LDP.

4. A double-acting tandem free-piston engine comprising:

a cylinder having first and second combustion chambers at opposite ends thereof and a third combustion chamber between said ends, a first double-acting piston displaceable between said first and third combustion chambers, and a second similar piston displaceable between said second and third combustion chambers, each double acting piston including opposite piston heads and a connecting rod between said heads, balancing means coupling said two pistons to move symmetrically, each of said combustion chambers including an inlet valve and an exhaust valve, said valves being timed to open and close to produce a pressure-volume relationship in each of said combustion chambers wherein said exhaust valves each opens and closes about 50°±15° before and after LDP, and said inlet valves each open and close respectively at about 30°±10° before LDP and 62°±10° after LDP, resulting in a pressure in each combustion chamber being below atmospheric for a period at least 10° before LDP and at least 30° after LDP.

5. Apparatus according to claim 4 further comprising, a linear alternator operable with each piston, each linear alternator comprising stator and runner parts, one of these parts secured to said rod and the other of said parts secured to the housing adjacent said rod.

6. Apparatus according to claim 5 wherein said third combustion chamber has opposite ends with an inlet valve and an exhaust valve at said opposite ends, said valves of said third combustion chamber being operable only when said two pistons are displaced away from each other toward said first and second combustion chambers.

7. Apparatus according to claim 5 further comprising inlet adjusting means for varying the time when any one of such inlet ports opens and closes and for varying the amount of opening of any one of said inlet ports.

8. Apparatus according to claim 7 wherein said means for adjusting any one of said inlet ports opening comprises an indented zone extending from the top of the piston head downward along one side which allows gas flow when its valve is open through said inlet port opening before the top of said piston head reaches and exposes said inlet port opening, and means for rotating said piston about its longitudinal axis to vary the amount of said indented zone that may cooperate with said inlet port opening.

9. Apparatus according to claim 8 wherein said means for adjusting further comprises a cam secured to said cylinder and movable between different positions, and a follower secured to said connecting rod, said cam being movable to thereby drive said follower for rotating said piston.

10. A hybrid vehicle comprising an engine-alternator system as defined in claim 5 and electrical storage battery charged by said engine-alternator, an electric generator-motor powered by said battery for driving each powered wheel of said vehicle, and a control system for operating said engine-alternator, battery and generator-motor elements.

11. In a hybrid vehicle including a frame, wheels, electric motors for driving the wheels, a storage battery for receiving electric current and for energizing said motors, and control means for operating said vehicle and components thereof, the improvement of a double-acting tandem free-piston engine-alternator for charging said battery, said engine-alternator comprising:

a housing including a cylinder having first and second combustion chambers at opposite ends thereof and a third combustion chamber between said ends, a first double-acting piston displaceable between said first and third combustion chambers, and a second similar piston displaceable between said second and third combustion chambers, each double acting piston including opposite piston heads and a connecting rod between said heads, a linear alternator operable with each piston, each linear alternator comprising stator and runner parts, one of these parts secured to said rod and the other of said parts secured to the housing adjacent said rod, balancing means coupling said two pistons to move symmetrically, each of said combustion chambers including an inlet valve and an exhaust valve, said valves being timed to open and close to produce a pressure-volume relationship in each of said combustion chambers wherein said exhaust valves of each combustion chamber open and close at a similar position of the corresponding piston, said position being $50^\circ \pm 20^\circ$ before and after lower dead position (LDP) of said piston and said inlet valves for each combustion chamber open and close respectively at about $30^\circ \pm 20^\circ$ before LDP and $62^\circ \pm 20^\circ$ after LDP.

12. A double-acting tandem free-piston engine comprising:

a housing including a cylinder having first and second combustion chambers at opposite ends thereof and a third combustion chamber between said ends, a first double-acting piston displaceable between said first and third combustion chambers, and a second similar piston displaceable between said second and third combustion chambers, each double acting piston including opposite piston heads and a connecting rod between said heads, balancing means coupling said two pistons to move symmetrically, each of said combustion chambers including an inlet valve and an exhaust valve, said valves being timed to open and close to produce a pressure-volume relationship in each of said combustion chambers wherein said exhaust valves each open and close during the same amount of piston displacement before and after LDP, and said inlet valves each opens at more piston displacement than for said exhaust valve and each closes at greater piston displacement than for said exhaust valve.

13. Apparatus according to claim 12 further comprising, a linear alternator operable with each piston, each linear alternator comprising stator and runner parts, one of these parts secured to said rod and the other of said parts secured to the housing adjacent said rod.

* * * * *